United States Patent
Wakabayashi et al.

(10) Patent No.: US 9,448,398 B2
(45) Date of Patent: Sep. 20, 2016

(54) ETALON AND ETALON DEVICE

(71) Applicant: KYOCERA CRYSTAL DEVICE CORPORATION, Higashine-shi, Yamagata (JP)

(72) Inventors: Kotaro Wakabayashi, Higashine (JP); Yukiko Furukata, Higashine (JP); Shiori Miyazaki, Higashine (JP)

(73) Assignee: KYOCERA CRYSTAL DEVICE CORPORATION, Higashine-shi (JP)

( * ) Notice: Subject to any disclaimer, the term of this patent is extended or adjusted under 35 U.S.C. 154(b) by 96 days.

(21) Appl. No.: 14/147,758

(22) Filed: Jan. 6, 2014

(65) Prior Publication Data

US 2014/0240838 A1 Aug. 28, 2014

(30) Foreign Application Priority Data

Feb. 28, 2013 (JP) ................................. 2013-038743

(51) Int. Cl.
*G02B 26/00* (2006.01)
*G02B 5/28* (2006.01)
*G02B 6/293* (2006.01)

(52) U.S. Cl.
CPC ............... *G02B 26/001* (2013.01); *G02B 5/28* (2013.01); *G02B 5/284* (2013.01); *G02B 6/29358* (2013.01); *G02B 6/29367* (2013.01); *G02B 26/00* (2013.01)

(58) Field of Classification Search
CPC .... G02B 5/28; G02B 5/284; G02B 5/29358; G02B 5/29367; G02B 26/00; G02B 26/001
USPC .......................... 359/240, 260, 577, 578, 579
See application file for complete search history.

(56) References Cited

U.S. PATENT DOCUMENTS

| | | | | |
|---|---|---|---|---|
| 4,547,801 | A * | 10/1985 | Haisma et al. | 378/98.3 |
| 6,826,205 | B1 * | 11/2004 | Myers | G02F 1/3523 372/11 |
| 2002/0191268 | A1 * | 12/2002 | Seeser | G02B 6/29358 359/260 |
| 2008/0186508 | A1 * | 8/2008 | Kiesel et al. | 356/519 |
| 2012/0044492 | A1 * | 2/2012 | Matsushita | G02B 26/001 356/326 |
| 2012/0045618 | A1 * | 2/2012 | Yamazaki | G01J 3/26 428/156 |
| 2012/0127471 | A1 * | 5/2012 | Urushidani | G02B 26/001 356/450 |
| 2012/0132349 | A1 * | 5/2012 | Matsuno | G02B 26/001 156/182 |

FOREIGN PATENT DOCUMENTS

| | | |
|---|---|---|
| JP | 3-72686 A | 3/1991 |
| JP | 2835068 B2 | 12/1998 |
| JP | 2003-195031 A | 7/2003 |
| JP | 2005-10734 A | 1/2005 |
| JP | 2006-202781 A | 8/2006 |

* cited by examiner

*Primary Examiner* — Bumsuk Won
*Assistant Examiner* — William R Alexander
(74) *Attorney, Agent, or Firm* — Westerman, Hattori, Daniel & Adrian, LLP

(57) ABSTRACT

An etalon has a pair of transparent components; a ring-shaped piezoelectric member which is provided between the pair of transparent components, which is bonded to the pair of transparent components, and which is provided with metal films on the surfaces which face the transparent component sides; and the external connecting terminals which are provided on the transparent components and which are connected to the metal films.

4 Claims, 7 Drawing Sheets

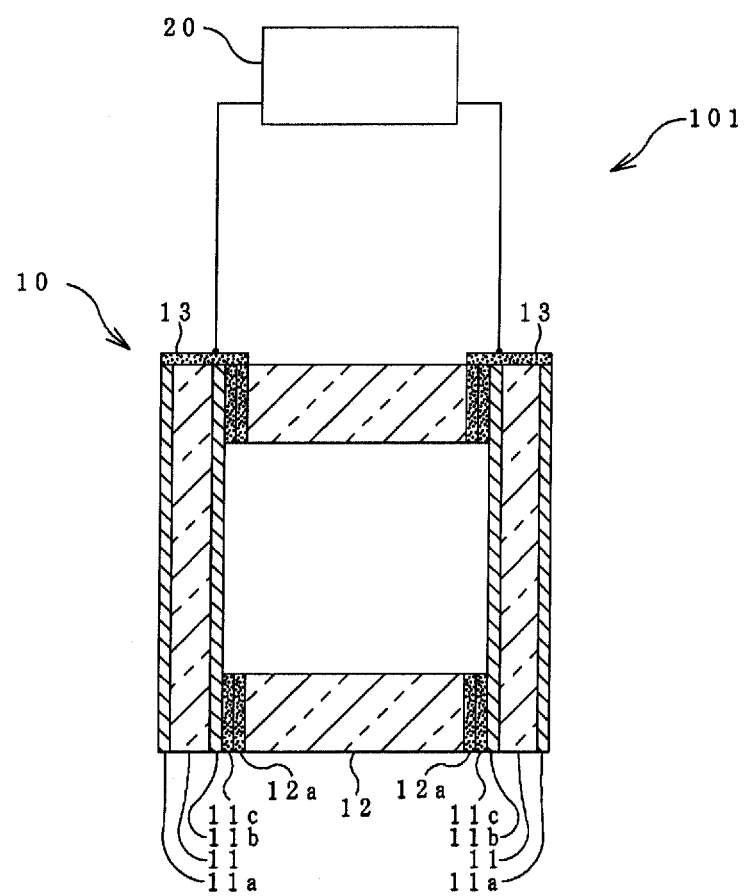

ETALON AND ETALON DEVICE

TECHNICAL FIELD

The present invention relates to an etalon and etalon device which is used in optical equipment.

BACKGROUND ART

Conventionally, etalons have been used in optical equipments such as optical communication equipments, measuring equipments, semiconductor lasers.

These etalons include solid types that are formed into cube shapes and air gap types that are configured by bonding ring-shaped members between transparent components which form parallel plates.

These etalons are provided in the paths for passage of light in optical equipment and are used while aligning the advancing direction of light with the longitudinal direction of the etalons (see for example PLT 1). Such air gap type etalons have to be adjusted in transmitted waveform. In general, this adjustment of transmitted waveform is carried out by adjusting the incidence angle of the light and the temperature.

CITATIONS LIST

Patent Literature

PLT 1: Japanese Patent No. 2835068

SUMMARY OF INVENTION

Technical Problem

However, the conventional etalon had the problem of troublesome adjustment of the transmitted waveform.

For example, when using the incidence angle of the light to adjust the transmitted waveform, the extinction ratio sometimes fell compared with the case where the light is vertically incident. Further, change of the incidence angle of light makes the change of the transmitted waveform larger, therefore tends to increase the adjustment process. For this reason, a state results requiring a lot of trouble and significant cost.

Further, for example, when using the temperature to adjust the transmitted waveform, use of a temperature regulator such as an etalon-use heater is envisioned. However, if there were a temperature regulator for electronic components other than an etalon, control of the etalon to a predetermined temperature is liable to become difficult.

Therefore, an object of the present invention is to provide an etalon and etalon device which solve the above problems and which enable easy adjustment of the transmitted waveform.

Solution to Problem

To solve the above problems, an etalon according to the present invention has a pair of transparent components; a ring-shaped piezoelectric member which is provided between the pair of transparent components, which is bonded to the pair of transparent components, and which is provided with metal films on the surfaces which face the transparent component sides; and the external connecting terminals which are provided on the transparent components and which are connected to the metal films.

Preferably, that the piezoelectric member is a crystal. when the Y-axis which is the crystal axis is a axis of rotation and a counterclockwise direction the standard of which is the Z-axis is a + direction, the surfaces of the piezoelectric member which face the transparent component sides are rotated within a range of ±10° when vertical to the X-axis is defined as 0°.

An etalon device according to the present invention has the etalon which is described above, and a variable voltage power supply which is connected to the external connecting terminals of the etalon.

Preferably, the etalon device has a switch for switching the polarity between the external connecting terminals and the variable voltage power supply.

Advantageous Effects of Invention

According to such an etalon, it becomes possible to make the piezoelectric member extend or contract by applying voltage to the external connecting terminals and becomes possible to change a resonator length in the etalon.

Further, according to such an etalon, the surfaces of the piezoelectric member which face the transparent component sides become surfaces which are rotated within a range of ±10° when the case vertical to the X-axis is 0°, so the deformation of extension/contraction when applying voltage to the external connecting terminals becomes large and it is possible to make the extent of adjustment of the transmitted waveform larger.

Further, according to such an etalon, in the piezoelectric member, the surfaces facing the transparent component sides, that is, the surfaces which are vertical to X-axis which is the crystal axis, are the X-surfaces, so it is possible to extend or contract the piezoelectric member in the transmission direction of the light when applying voltage to the external connecting terminals and possible to make the extent of adjustment of the transmitted waveform larger.

Further, according to such an etalon device, by connecting a variable voltage power supply to the external connecting terminals which are connected to the metal films provided on the ring-shaped piezoelectric member, it is possible to extend or contract the etalon by an operation from the outside of the path of the light and possible to adjust the degree of extension or contraction.

Further, according to such etalon device, by connecting a variable voltage power supply to the external connecting terminals which are connected to the metal films provided on the ring-shaped piezoelectric member and providing a switch between the etalon and the variable voltage power supply, it is possible to selectively adjust the degree of extension or contraction of the piezoelectric nether.

BRIEF DESCRIPTION OF DRAWINGS

FIG. 5 is a conceptual view which shows an example of an etalon device according to a second embodiment of the present invention.

DESCRIPTION OF EMBODIMENTS

Figure 1A:
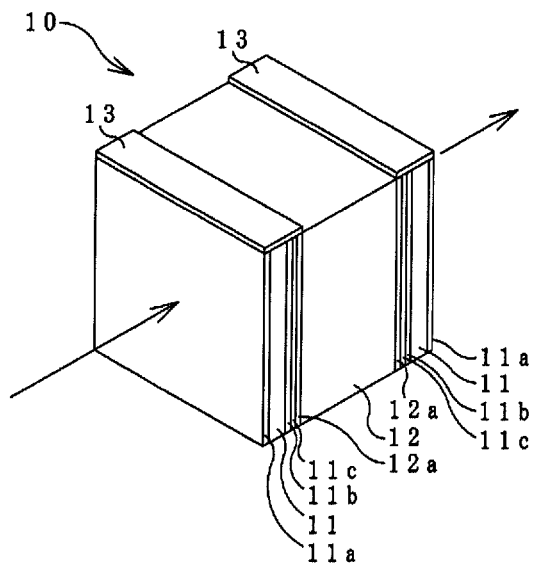
FIG. 1A is a perspective view which shows an example of an etalon according to a first embodiment of the present invention.

Next, the best modes for working the present invention (hereinafter, also referred to as the "embodiments") will be explained in detail while suitably referring to the drawings. Note that, the components are exaggeratedly shown for easy understanding of the states.

First Embodiment

Figure 1B:
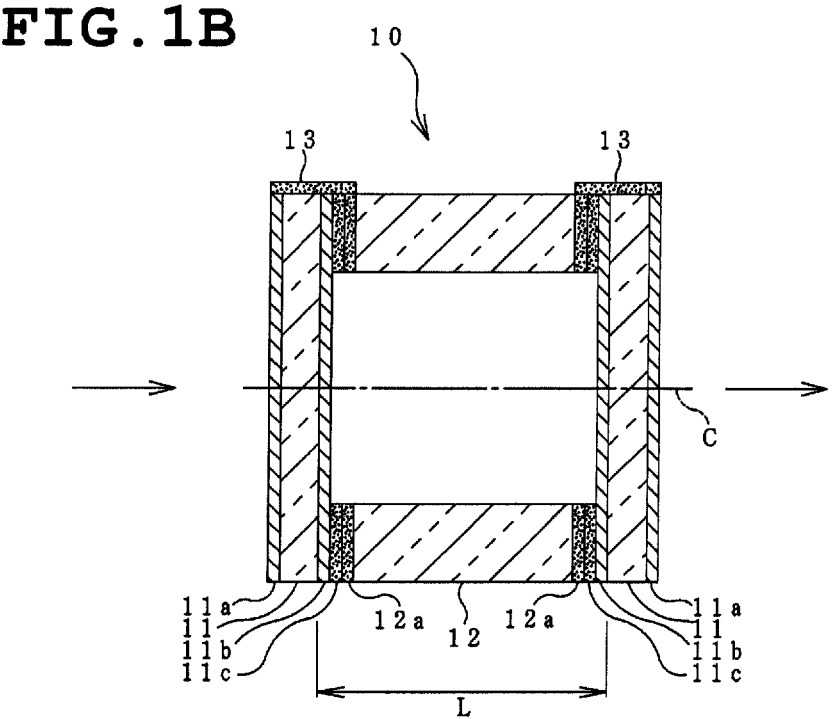
FIG. 1B is a cross-sectional view of the etalon according to the first embodiment of the present invention.

An etalon 10 according to a first embodiment of the present invention is, as shown in FIGS. 1A and 1B, mainly configured by a pair of two transparent components 11, a piezoelectric mother 12, and external connecting terminals 13.

For the transparent components 11, use is made of for example colorless and transparent material such as glass or crystal. The two transparent components 11 are used as a pair. These transparent components 11 are formed as parallel plates which have predetermined thicknesses and are formed in for example square shapes when viewed on a plane. A distance between the major surfaces of these two transparent components which face each other becomes a resonator length L (see FIG. 1B). Further, in these transparent components 11, antireflection coatings 11a are provided on first major surfaces, and reflection coatings 11b are provided on the other major surfaces. Note that, when referred to as the "major surface", a surface upon/from which light is incident/emitted is defined as the major surface, and the four surfaces surrounding this major surface are defined as side surfaces.

Note that, the transparent components 11 may be formed in wedge shapes as well. The transparent components 11 formed in wedge shapes are configured with the 11a surfaces inclined relative to the 11b surfaces. When configuring the transparent components 11 in this way, unnecessary reflection from the 11a surfaces can be prevented.

Further, on at least one side surface of each of these transparent components 11, an external connecting terminal 13 which will be explained later is provided.

Note that, the antireflection coatings 11a are provided on the other major surfaces of the transparent components 11 by for example conventionally known vapor deposition. Further, the reflection coatings 11b are provided on first major surfaces of the transparent components 11 by for example conventionally known vapor deposition.

Note that, the reflection coatings 11b are provided on the major surfaces which face the piezoelectric member 12 sides. Further, the antireflection coatings 11a are provided on the major surfaces on the sides opposite to the reflection coatings 11b. Accordingly, in a state where the transparent components 11 are bonded to the piezoelectric member 12, the antireflection coatings 11a are provided on the outsides, and the reflection coatings 11b are provided at positions sandwiched by bonding the members.

Metal films 11c are provided in ring shapes on these reflection coatings 11b. Accordingly, a state is obtained where the metal films 11c are provided on the surfaces of the transparent components 11 which face the piezoelectric member 12 side. In these metal films 11c, for example, the underlying metal films are comprised of chromium, and the main metal films are comprised of gold. These can be provided in ring shapes by photolithography, sputtering, or vapor deposition.

The external connecting terminals 13 are connected to the metal films 11c which are provided on the transparent components 11 and to the metal films 12a which are provided on the piezoelectric member 12.

The external connecting terminals 13 are configured by for example underlying metal films and main metal films. In the external connecting terminals 13, use is made of for example chromium as the underlying metal films, and, for example, gold (Au) is provided on the underlying metal films to configure the terminals.

Such external connecting terminals 13 can be provided for example by using photolithography, sputtering, or vapor deposition after bonding the pair of two transparent components 11 and the piezoelectric member 12.

Note that, the external connecting terminals 13 are provided so as not catch on the piezoelectric member 12 so as not to obstruct the extension or contraction of the piezoelectric member 12.

Figure 3A:
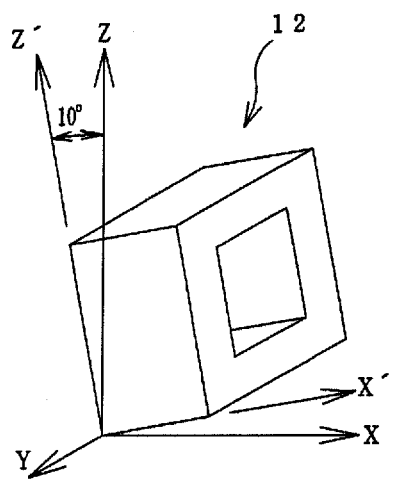
FIG. 3A is a perspective view which shows an example of a piezoelectric member which is provided with a predetermined cutting angle.
Figure 3B:
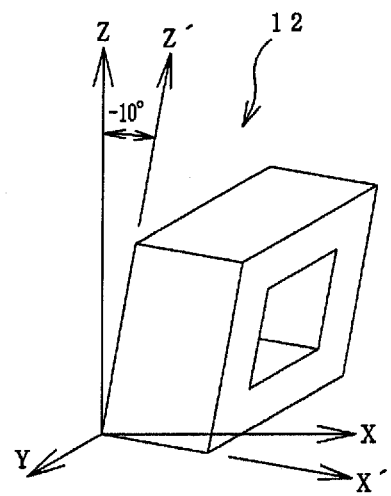
FIG. 3B is a perspective view which shows an example of a piezoelectric member which is provided with another cutting angle.

The piezoelectric member 12 is, as shown in FIG. 3A and FIG. 3B, formed in for example a ring shape. When the center of the internal space is defined as a central axis C (see FIG. 1B), the ring has thickness along a central axis. In this piezoelectric member 12, the cross-section formed when cutting this in a direction perpendicular to the central axis becomes a square ring-shaped cross-section. Note that, it may become a circular cross-section as well. That is, the piezoelectric member 12 has a structure having thickness while maintaining this square ring-shaped cross-section.

The piezoelectric member 12 is formed in a ring shape by for example forming a through part by wet etching of a predetermined position of a plate and machining along the outer shape. The ring shape may be a circular shape or square ring shape as well.

For example, when wet etching is used to form the through part, a resist is provided on the surface of a piezoelectric wafer which forms the piezoelectric member, this is exposed with a predetermined pattern, then this is developed to expose the surface of the piezoelectric wafer, and the exposed portion of the piezoelectric wafer is removed by wet etching to thereby form a through part. Note that, the through part may be provided by a drilling or another piercing operation as well.

When referenced with respect the central axis, this square ring-shaped cross-section become the same as the shape of the end faces of the piezoelectric member 12. Accordingly, the end faces of the piezoelectric member 12 are square ring shapes, and the metal films 12a are provided on these end faces on the two sides. Further, the piezoelectric member 12 is used in a state where its surfaces facing the transparent component 11 sides, that is, the end faces, face the direction of the transparent components 11.

Figure 2:
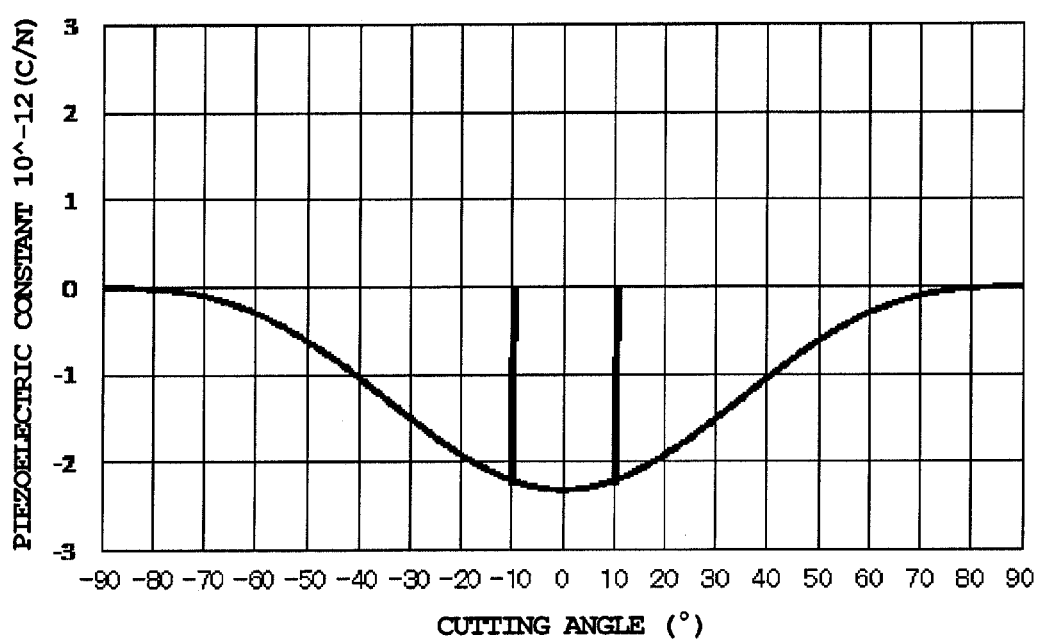
FIG. 2 is a graph which shows the relationships between a cutting angle and a piezoelectric constant.

For this piezoelectric member 12, for example, crystal is used. As shown in FIG. 2, FIG. 3A, and FIG. 3B, when the Y-axis which is the crystal axis is the axis of rotation and a counterclockwise direction the standard of which is the Z-axis is a + direction, the surfaces of the piezoelectric member 12 which face the transparent component 11 sides, that is, the end faces, are rotated within a range of −10° (see FIG. 3B) to +10° (see FIG. 3A) when vertical to the X-axis is defined as 0°. The crystal is cut at this cutting angle to form the plate for the piezoelectric member 12. The X-axis and Z-axis rotated by this rotation are newly defined as an X'-axis and Z'-axis.

As shown in FIG. 2, the relationship between the cutting angle and the piezoelectric constant in the case where the Y-axis which is the crystal axis is the axis of rotation and a counterclockwise direction the standard of which is the Z-axis is the + direction becomes a relationship where there is little change in the piezoelectric constant within a range of ±10° when vertical to the X-axis is defined as 0°. The further from this range of the cutting angle, the smaller the piezoelectric constant in this relationship.

In order to adjust the transmitted waveform, it is necessary to change the refractive index or resonator length of the etalon 10. The change of the resonator length is related to the change of strain of the piezoelectric member 12. This strain means that the piezoelectric member 12 extends or contracts to make the resonator length longer or shorter (see FIG. 4). Due to enlargement of this strain, the extent of adjustment of the transmitted waveform can be made larger.

Here, the strain (S) is determined according to an elastic compliance constant (s), stress (T), piezoelectric constant (d), and electric field (E).

The calculation formula is indicated by the following Formula 1.

$$S = s \times T \times d \times E \quad \text{(Formula 1)}$$

It is seen from Formula 1 that the strain can be larger with a small electric field E by making the piezoelectric constant larger. Accordingly, it is seen from FIG. 2 that a range not more than ±10° becomes a range that can make the extent of adjustment of the transmitted waveform larger.

Accordingly, when the piezoelectric member 12 is configured within this range, a structure in which the piezoelectric member 12 extends along the central axis, i.e., X-axis or X'-axis, in terms of the crystal axis can be obtained.

Further, this strain occurs due to an inverse piezoelectric phenomenon by applying voltage to the metal films 12a which are provided on the two end faces of the piezoelectric member 12, whereby the piezoelectric member 12 can be extended along the central axis C (see FIG. 1B). Further, when application of voltage is suspended, the extended state is released and the member contracts, therefore the original state can be restored.

Further, as shown in FIG. 4, by switching the polarity of the current, switching between the extended state and the contracted state can be selectively carried out.

In particular, when the Y-axis which is the crystal axis is the axis of rotation and the counterclockwise direction the standard of which is the Z-axis is the + direction, the surfaces of the piezoelectric member 12 which face the transparent component 11 sides, that is, the end faces, are rotated within a range of ±10° when vertical to the X-axis is defined as 0°, and using this as this cutting angle, the piezoelectric member 12 tends to extend.

In a case of an angle other than this cutting angle, the piezoelectric member 12 becomes harder to extend, therefore it becomes impossible make the extent of adjustment of the transmitted waveform larger.

However, when the piezoelectric constant becomes 0, strain is not caused, therefore the piezoelectric member 12 cannot be extended. Further, in the case of a piezoelectric constant which is far frown a cutting angle within the range of ±10° described above, the piezoelectric member 12 can be extended, but the change of the piezoelectric constant relative to the cutting angle is large, therefore handling after forming a product becomes difficult, so difficult adjustment for extending the piezoelectric member 12 is expected.

The pair of two transparent components 11 and the piezoelectric member 12 are bonded by using for example atomic diffusion junctions.

For example, transparent component wafers (not shown) for forming the pair of two transparent components 11 and made of for example glass plate are provided with antireflection coatings 11a on first major surfaces, are provided with reflection coatings 11b on the other major surfaces, and are provided with metal films 11c on the reflection coatings 11b.

Further, a piezoelectric member wafer (not shown) made of crystal for forming the piezoelectric member 12 is provided with position which forms a space at a portion which becomes the ring-shaped piezoelectric member 12 as a through part. It is provided with underlying metal films made of chromium on the two major surfaces of this piezoelectric nether wafer and is provided with main metal films made of gold on these underlying metal films, whereby the metal films 12a are formed.

These pair of two transparent component wafers and the piezoelectric member wafer are for example bonded to each other in any atmosphere of a vacuum atmosphere, air environment, and inert gas atmosphere in a state where one transparent component wafer, the piezoelectric member wafer, and another transparent component wafer are superimposed on each other so as to grip the piezoelectric member wafer, then they are pressed by a predetermined pressure.

That is, the state where the metal films are bonded to each other in the state where the metal films 11c of the transparent components 11 and the metal films 12a of the piezoelectric member 12 are superimposed on each other is exhibited. Note that, heating may be carried out at this bonding as well.

After bonding, by cutting the wafers along the outer shapes of the transparent components 11 and the outer shapes of the piezoelectric members 12, that is, the outer shapes of the etalons 10, individual etalons 10 can be formed.

These individual etalons 10 are arranged in a predetermined jig which is provided with through-holes in portions in which external connecting terminals are to be formed. The side surfaces of the pair of two transparent components are coated by vapor deposition, sputtering, or the like to provide external connecting terminals 13.

Due to this, etalons of the present invention can be produced.

In this way, according to the etalon 10 according to the first embodiment of the present invention, voltage can be applied to the external connecting terminals 13, therefore it becomes possible to extend or contract the piezoelectric member 12, so the resonator length in the etalon 10 can be changed.

Further, the surfaces of the piezoelectric member 12 which face the transparent components 11 are surfaces which are rotated within a range of ±10° where the case vertical to the X-axis is defined as 0°, so deformation of extension or contraction when applying voltage to the external connecting terminals 13 becomes larger and the extent of adjustment of the transmitted waveform can be made larger.

Second Embodiment

An etalon device 101 according to a second embodiment of the present invention is, as shown in FIG. 5, mainly configured by using an etalon according to the etalon 10 of the first embodiment of the present invention and providing a variable voltage power supply 20 which is connected to the external connecting terminals 13 provided on the outer circumferential surfaces of the transparent components 11 which are components of the etalon.

For the voltage variable power supply 20, for example, use is made of a conventionally known voltage variable power supply which is provided with an interconnect having a + (plus) polarity and an interconnect having a − (minus) polarity. The interconnect having the + polarity is connected to one external connecting terminal 13 which is exposed at the outer circumferential surface of the etalon 10, while the interconnect having the − polarity is connected to the other external connecting terminal 13 which is exposed at the outer circumferential surface of the etalon 10.

Figures 4A, 4B:
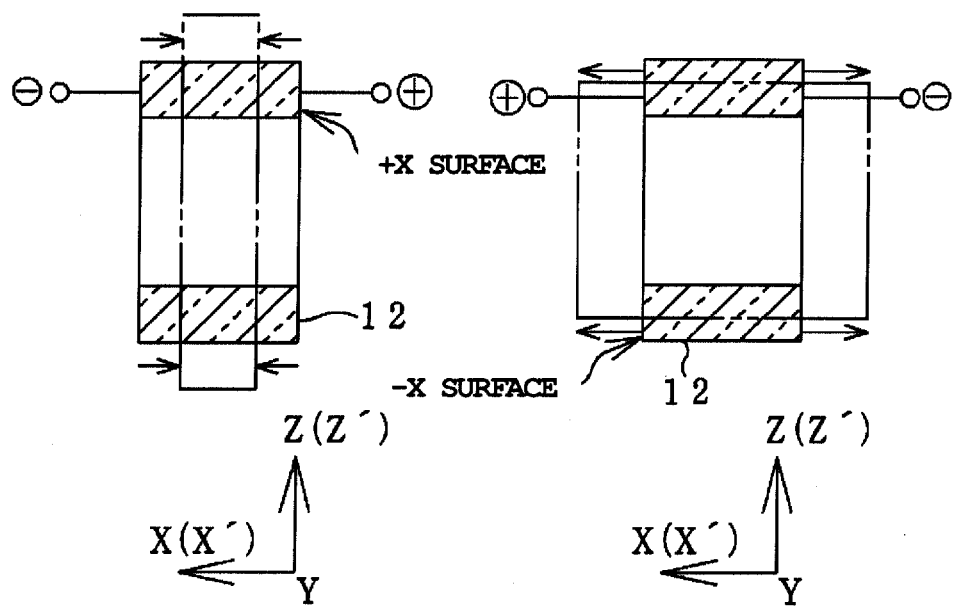
FIG. 4A is a conceptual view which shows an example of a state where the piezoelectric member contracts when the surfaces which face the transparent component sides are X-surfaces which are perpendicular to the X-axis.
FIG. 4B is a conceptual view which shows an example of an extended state.

For example, in the case of the etalon according to the first embodiment, as shown in FIGS. 4A and 4B, when voltage is applied to the external connecting terminals 13, the piezoelectric member 12 will extend or contract in the X-axis direction or X'-axis direction.

Specifically, when the interconnect having the + polarity is connected to the +X surface, the piezoelectric member 12 will contract in the X-axis direction (see FIG. 4A). Further, when the interconnect having the + polarity is connected to the −X surface, it will extend in the X-axis direction (see FIG. 4B).

Further, by changing the magnitude of the voltage applied by the variable voltage power supply 20, the degree of extension or contraction of the piezoelectric nether 12 can be changed.

At this time, in the etalon 10, between the pair of two transparent components 11, one transparent component 11 is configured as a fixed end, while the other transparent component 11 is configured as a free end (not shown). Due to this, obstruction of extension/contraction of the piezoelectric member 12 can be prevented.

In this way, according to the etalon device 101 according to the second embodiment of the present invention, by employing a configuration where the variable voltage power supply 20 is connected to the external connecting terminals 13 which are connected to the metal films 12a provided on the ring-shaped piezoelectric member 12, the etalon 10 can be extended or contracted by operation from outside of the path of light, and the degree of that extension or contraction can be adjusted.

Third Embodiment

Figure 6:
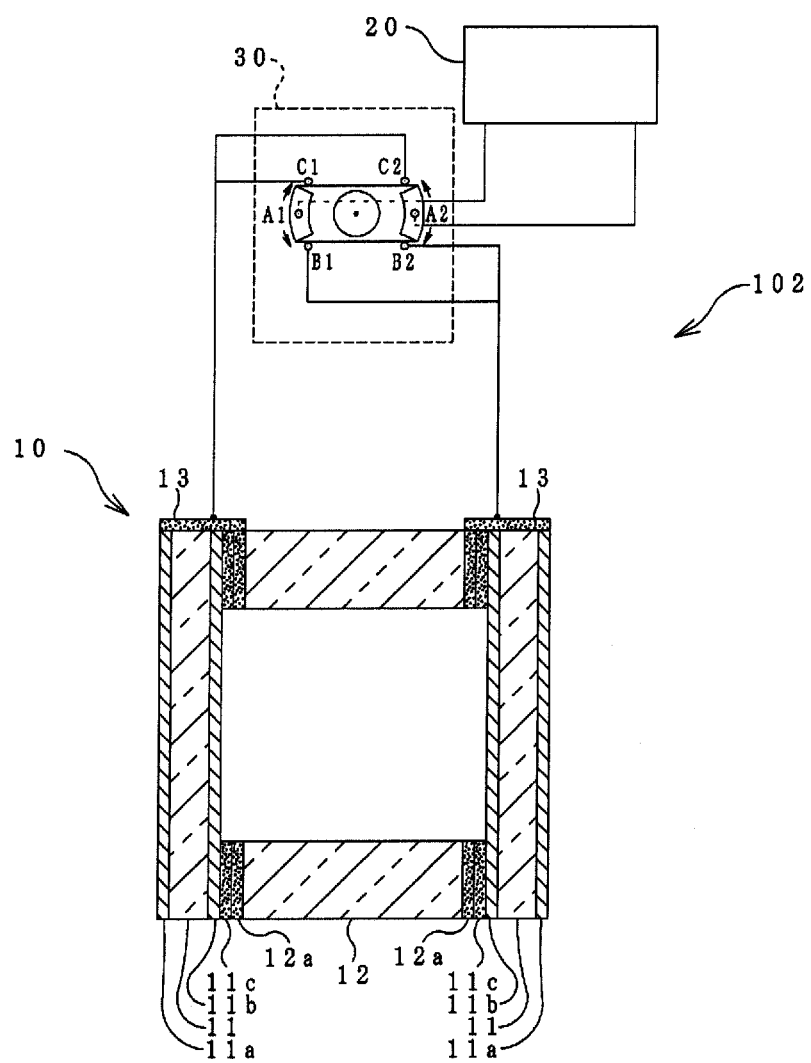
FIG. 6 is a conceptual view which shows an example of an etalon device according to a third embodiment of the present invention.
Figure 7:
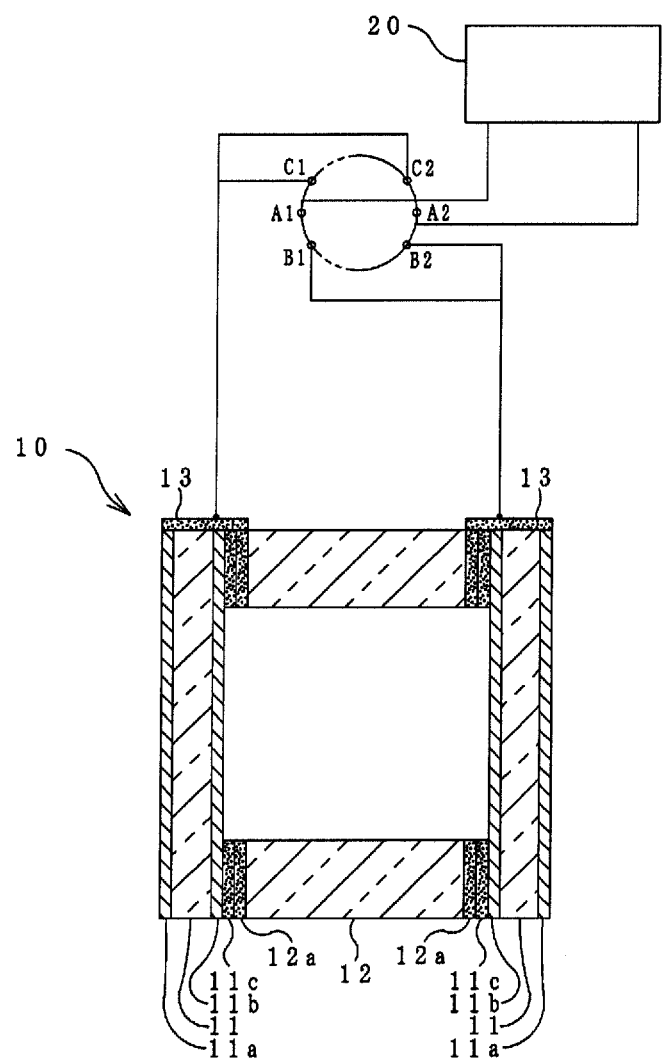
FIG. 7 is a conceptual view which shows an example of a terminal used for a switch of the etalon device according to the third embodiment of the present invention.

An etalon device 102 according to a third embodiment of the present invention differs from the second embodiment in the point that, as shown in FIG. 6 and FIG. 7, a switch 30 for switching the polarity is provided between the etalon 10 according to the first embodiment and the variable voltage power supply 20.

The switch 30 performs the role of switching the polarity between the external connecting terminals 13 provided in the etalon 10 and the variable voltage power supply 20.

For example, the switch 30 is provided with a switching mechanism having a rotation structure. The terminal of the interconnect which has the + polarity and is connected to the variable voltage power supply 20 is defined as A1, the terminal of an interconnect which has the − polarity and is connected to the variable voltage power supply 20 is defined as A2. Terminals of the interconnect which are connected to one external connecting terminal 13 of the etalon 10 are defined as B1 and B2, and terminals of an interconnect which are connected to the other external connecting terminal 13 of the etalon 10 are defined as C1 and C2.

Here, the terminals are arranged on the same circumference, and the terminals are arranged at equal intervals in an order of the terminals C1, A1, and B1 in the counterclockwise direction, the terminals are arranged at equal intervals in an order of the terminals B2, A2, and C2 in the counterclockwise direction, and further the terminals are arranged so that the terminals A1 and A2 face each other, the terminals B1 and B2 face each other, and the terminals C1 and C2 face each other.

The switch 30 extends in the diametrical direction about the center of the concentric circle as the axis of rotation. Contact terminal areas each having a size large enough to connect the two terminals are provided on the two ends of the switch.

Accordingly, this switch is in a disconnected state when it is brought into contact with the terminals A1 and A2.

Further, when rotated in the clockwise direction, this switch 30 exhibits a state where the terminals A2 and B2 are connected while connecting the terminals A1 and C1.

Further, when rotated in the counterclockwise direction, this switch 30 exhibits a state where the terminals A2 and C2 are connected while connecting the terminals A1 and B1.

Due to this, the interconnect having the + polarity and the interconnect having the − polarity which are connected to the variable voltage power supply 20 can be connected to the etalon 10 by switching.

In this way, according to the etalon device 102 according to the third embodiment of the present invention, by connecting the variable voltage power supply 20 to the external connecting terminals 13 which are connected to the metal films 12a provided on the ring-shaped piezoelectric member 12 and providing the switch 30 between the etalon 10 and the variable voltage power supply 20, the degree of extension or contraction of the piezoelectric member 12 can be selectivity adjusted.

10 etalon
11 transparent component
11a antireflection coatings
11b reflection coatings
11c metal film
12 piezoelectric member
12a metal film
13 external connecting terminal
20 variable voltage power supply
30 switch
101, 102 etalon device

The invention claimed is:
1. An etalon comprising:
a pair of transparent components;
a ring-shaped piezoelectric member which is provided between the pair of transparent components to surround a space between the pair of transparent components;
a first metal film being provided on each surface of the ring-shaped piezoelectric member that faces the transparent component;
a reflection coating being provided on a surface of each said transparent component that faces the ring-shaped piezoelectric member;
a second metal film having a ring shape, the second metal film provided between the first metal film provided on each surface of the ring-shaped piezoelectric member and the reflection coating provided on the surface of each said transparent component so as to bond the second metal film to the first metal film and to bond the ring-shaped piezoelectric member and the pair of transparent components together; and the external connecting terminals which are provided on the transparent components and which are connected to at least the second metal films, wherein a total thickness of the first metal film, reflection coating and second metal film provided on each of the respective surface being less than a thickness of the ring-shaped piezoelectric member.

2. The etalon according to claim 1, wherein the piezoelectric member is a crystal and, when the Y-axis which is the crystal axis is an axis of rotation and a counterclockwise direction the standard of which is the Z-axis is a positive direction, the surfaces of the piezoelectric member which face the transparent component sides are configured to rotate within a range of ±10° when vertical to the X-axis is defined as 0°.

3. An etalon device comprising:

the etalon according to claim 1, and a variable voltage power supply which is connected to the external connecting terminals of the etalon.

4. The etalon device according to claim 3, comprising a switch for switching the polarity between the external connecting terminals and the variable voltage power supply.

* * * * *